US011893175B2

(12) United States Patent
Vinje (10) Patent No.: US 11,893,175 B2
(45) Date of Patent: Feb. 6, 2024

(54) PROVIDING A DRIVEN SHIELD DURING CAPACITANCE MEASUREMENT

(71) Applicant: Microchip Technology Incorporated, Chandler, AZ (US)

(72) Inventor: Anders Vinje, Trondheim (NO)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/931,810

(22) Filed: Sep. 13, 2022

(65) Prior Publication Data

US 2023/0010436 A1  Jan. 12, 2023

Related U.S. Application Data

(60) Division of application No. 15/997,518, filed on Jun. 4, 2018, now Pat. No. 11,442,586, which is a continuation of application No. PCT/US2018/033511, filed on May 18, 2018.

(60) Provisional application No. 62/508,848, filed on May 19, 2017.

(51) Int. Cl.
G06F 3/041 (2006.01)
G06F 3/044 (2006.01)

(52) U.S. Cl.
CPC ......... *G06F 3/0412* (2013.01); *G06F 3/044* (2013.01); *G06F 3/0418* (2013.01); *G06F 3/0446* (2019.05); *G06F 3/04166* (2019.05); *G06F 3/04186* (2019.05); *G06F 3/041662* (2019.05); *G06F 2203/04107* (2013.01)

(58) Field of Classification Search
None
See application file for complete search history.

(56) References Cited

U.S. PATENT DOCUMENTS

| | | | |
|---|---|---|---|
| 5,648,642 A | 7/1997 | Miller et al. | |
| 5,730,165 A | 3/1998 | Philipp | |
| 6,288,707 B1 | 9/2001 | Philipp | |
| 6,452,514 B1 | 9/2002 | Philipp | |
| 9,377,905 B1 | 6/2016 | Grivna et al. | |
| 2010/0052700 A1* | 3/2010 | Yano | G06F 3/0446 324/658 |
| 2011/0001549 A1 | 1/2011 | Van Gastel | |
| 2012/0176179 A1 | 7/2012 | Harders et al. | |
| 2013/0307821 A1 | 11/2013 | Kogo | |

(Continued)

FOREIGN PATENT DOCUMENTS

| | | |
|---|---|---|
| CN | 103718143 A | 4/2014 |
| JP | 2015-121958 A | 7/2015 |
| WO | 2013/018911 A1 | 2/2013 |

OTHER PUBLICATIONS

International Search Report dated Nov. 13, 2018 for WO Application No. PCT/US18/033511, 4 pages.

(Continued)

*Primary Examiner* — Andre L Matthews
(74) *Attorney, Agent, or Firm* — TraskBritt (57) ABSTRACT

One or more examples of the present disclosure relate generally to systems and methods for canceling mutual capacitive effects in a capacitance measurement. Some examples relate to providing a driven shield during capacitance measurement. Some examples relate to providing such a driven shield using rail-to-rail voltage.

13 Claims, 10 Drawing Sheets

(56) References Cited

U.S. PATENT DOCUMENTS

2015/0160754 A1* 6/2015 Wenzel ............ G06F 3/041662
              345/174
2015/0268790 A1  9/2015 Meyer
2016/0117014 A1  4/2016 Davison et al.
2017/0308219 A1* 10/2017 Aas ........................ G06F 3/044

OTHER PUBLICATIONS

Taiwan Search Report and Office Action from Taiwanese Application No. 107116846, dated Mar. 28, 2019, 12 pages.
Written Opinion of the International Search Authority dated Nov. 13, 2018 for WO Application No. PCT/US18/033511, 8 pages.
Chinese First Office Action for Chinese Application No. 201880032735.9, dated Nov. 21, 2022, 23 pages with translation.

* cited by examiner

PROVIDING A DRIVEN SHIELD DURING CAPACITANCE MEASUREMENT

CROSS-REFERENCE TO RELATED APPLICATIONS

This application is a divisional of U.S. patent application Ser. No. 15/997,518, filed Jun. 4, 2018, now U.S. Pat. No. 11,442,586 issued Sep. 13, 2022, which is a continuation of International Patent Application No. PCT/US2018/033511, filed May 18, 2018, which claims the benefit of U.S. Provisional Patent Application Ser. No. 62/508,848, filed May 19, 2017, the contents and disclosure of each of which are hereby incorporated herein in their entirety by this reference.

TECHNICAL FIELD

The examples of the present disclosure relate generally to systems and methods for canceling mutual capacitive effects in a capacitive touch interface and, more specifically, implementing a driven shield using rail-to-rail voltage.

BACKGROUND

Touch interfaces may incorporate capacitive proximity sensors to detect an object in close proximity to or contacting the contact sensitive surface of the interface. Touchpads used with personal computers, including laptop computers and keyboards for tablets, often include touch interfaces. A screen may integrate touch interfaces, and be used with, for example, portable media players, televisions, smartphones, tablet computers, personal computers, watches, and other consumer products may incorporate touch screens. Further, control panels for automobiles, appliances (e.g., ovens, refrigerators, washing machines, etc.), security systems, automatic teller machines (ATMs), and heating control systems may incorporate touch screens. These are just a few non-limiting examples.

Water or other liquids on a touch sensitive surface may cause unwanted capacitive effects during operation of a capacitive proximity sensor. A driven shield may reduce or eliminate those unwanted effects in the capacitive proximity sensor. A typical driven shield technique is to incorporate a buffer to continuously track the sense electrode and drive electrode voltages for all other electrodes or a subset of neighboring electrodes. An effect of this technique is that the mutual capacitance between an active/measured sense electrode and the tracked electrodes ideally has no or inconsequential charge contribution to a capacitive measurement sequence and is "invisible" to the measurement.

BRIEF SUMMARY

Examples of the disclosure relate, generally, to a capacitive touch circuitry. The capacitive touch circuitry includes an interface circuitry and a driven shield circuitry. The driven shield circuitry is operatively coupled to the interface circuitry and configured to vary a shield voltage from a first voltage rail during a number measurement cycles to a second voltage rale after the number of measurement.

Examples of the disclosure relate, generally, to a method of providing a driven shield. The method may include taking a number of measurements at a sensed line over a number of measurement cycles, the measurement responsive to a voltage change at that sensed line; and varying a voltage applied to at least one non-sensed line over the number of measurement cycles, wherein a voltage change at the at least one non-sensed line is different than the voltage change at the sensed line.

Examples of the disclosure relate, generally, to a capacitive touch circuitry. The capacitive touch circuitry may include electrode circuitry, driven shield circuitry, and self-capacitance sensing circuitry. The driven shield circuitry is configured to drive one or more inactive electrodes of the electrode circuitry between two reference voltage rails in order to induce mutual capacitive effects at an active sense electrode. The self-capacitance sensing circuitry is operatively coupled to the active sense electrode and configured to provide one or more measurable signals that are indicative of the induced mutual capacitive effects.

Examples of the disclosure relate, generally, to a method of performing capacitive sensing on a touch sensor. The method includes: driving a first voltage rail at first inactive sense lines and first inactive drive lines during a predetermined number of measurement phases of a first measurement cycle; measuring an active sense line during the first measurement cycle; driving a first voltage change to a second voltage rail at the first inactive sense lines and the first inactive drive lines before a subsequent measurement cycle; and measuring the active sense line while the second voltage rail is driven and during a last measurement phase of the first measurement cycle.

Examples of the disclosure relate, generally, to a microcontroller package. The microcontroller package includes a number of programmable input/output (I/O) pins, sensing circuitry, and a touch controller. The sensing circuitry is configured to provide one or more measurable signals that are indicative of voltage changes at one or more of the number of programmable I/O pins. The touch controller is configured to provide a driven shield voltage during a number of measurement cycles, by: holding one or more programmable I/O pins associated with inactive drive electrodes and inactive sense electrodes to a first voltage rail during a first measurement cycle; and driving the one or more programmable I/O pins associated with inactive drive electrodes and inactive sense electrodes to a second voltage rail during a last measurement cycle.

BRIEF DESCRIPTION OF THE DRAWINGS

The purpose and advantages of the various examples of the disclosure will be apparent to one of ordinary skill in the art from the detailed description in conjunction with the following accompanying figures.

DETAILED DESCRIPTION

The illustrations presented herein are not meant to be actual views of any particular act in a method of fabricating a semiconductor device, intermediate product of such a method, semiconductor device, or component thereof, but are merely idealized representations employed to describe illustrative examples of the present disclosure. Thus, the drawings are not necessarily to scale.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

It should be understood that any reference to an element herein using a designation such as "first," "second," and so forth does not limit the quantity or order of those elements, unless such limitation is explicitly stated. Rather, these designations are used herein as a convenient method of distinguishing between two or more elements or instances of an element. Thus, a reference to first and second elements does not mean that only two elements can be employed or that the first element must precede the second element in some manner. Also, unless stated otherwise a set of elements may comprise one or more elements. Likewise, sometimes elements referred to in the singular form may also include one or more instances of the element.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example or this disclosure to the specified components, steps, features, functions, or the like.

As understood for purposes of the examples described in this disclosure, a contact sensor may respond to an object's (such as a finger or a stylus) contact with, or the object's proximity to, a contact-sensitive area of the contact sensor. In this disclosure "contact" and "touch" may mean both an object's physical contact with a contact-sensitive area and an object's presence within the proximity of a contact-sensitive area without physical contact.

Some examples described herein relate, generally, to techniques for canceling unwanted capacitive effects in a capacitive touch interface. In particular, some examples described herein relate to canceling unwanted mutual capacitive effects in the drive and sense electrode circuitry. Thus, for a self-capacitive sensing configuration, the self-capacitance measurements may be isolated from mutual-capacitive effects. In some examples the only form of capacitive sensing may be self-capacitive sensing. In other examples, the self-capacitive sensing may be in addition to mutual capacitive sensing, for example, to confirm a mutual capacitive measurement indicating a touch event.

Some examples described herein relate, generally, to a touch screens that implement techniques for canceling unwanted capacitive effects for moisture rejection. Unwanted capacitive effects may be introduced by moisture on a contact sensitive surface of a touch screen. Thus, some examples provide a form of moisture rejection, though any form of unwanted mutual capacitance may be considered "rejected."

Some examples described herein relate, generally, to a touch controller that implements techniques for canceling unwanted capacitive effects in firmware and one or more general purpose input/output (GPIO) pins and the supplied Vdd and Vss. For example, the GPIO pins may be operatively coupled to the drive and sense lines of a touch sensor, and, one or more driven shield techniques described herein are executed. All or a technically relevant amount of unwanted capacitive effects are eliminated in sensed signals received at a touch acquisition circuit operatively coupled to the sense lines of the touch sensor and input pins of the touch controller.

When an object contacts a capacitive contact sensor a change in capacitance may occur within the sensor at or near the location of the contact. For example, an analog contact sensing circuit may "detect" the contact if it meets a certain threshold. "Charge-then-transfer" is a technique implemented in some contact-sensing circuits to detect capacitive changes at the sensor, whereby a sensing capacitor is charged and the charge is transferred to an integrating capacitor over multiple charge-transfer cycles. The amount of charge associated with such a charge-transfer may be converted to digital signals by an analog-to-digital converter (ADC) and a controller may measure those digital signals to determine if an object contacted the sensor and information about the contact (e.g., location).

Self-capacitance sensors are capacitive field sensors that detect/respond to changes in capacitance to ground. An example of a self-capacitive sensor including a circuit employing repetitive charge-then-transfer cycles using common integrated CMOS push-pull driver circuitry having floating terminals is described in U.S. Pat. No. 5,730,165, entitled "Time Domain Capacitive Field Detector," issued on Mar. 24, 1998, the entire contents and disclosure of which is hereby incorporated herein by this reference.

Mutual capacitance sensors are capacitive field sensors that detect changes in capacitance between two electrodes: a drive electrode and a sense electrode. The principles of mutual capacitance sensing are described in U.S. Pat. No. 6,452,514, entitled "Capacitive Sensor and Array," issued on Sep. 17, 2002, the entire contents and disclosure of which is hereby incorporated herein by this reference.

Touch screen sensors are a type of contact-sensors overlaid in a two-dimensional (2D) arrangement on a display screen for user interaction. The display screens that incorporate touch sensors are commonly referred to as "touch screens" or "touch panels" and they may be grouped into the same types as touch sensors: resistive, surface acoustic wave, and capacitive. The use of the charge-transfer technology described in U.S. Pat. No. 5,730,165 in one- and two-dimensions is described in U.S. Pat. No. 6,288,707, entitled "Charge Transfer Capacitive Position Sensor," issued on Oct. 15, 2002, the entire contents and disclosure of which is hereby incorporated herein by this reference. A matrix sensor approach of mutual capacitance sensors employing charge-transfer techniques for a touch screen is described in U.S. Pat. No. 5,648,642, entitled "Object Position Detector," issued Jul. 15, 1997, the entire contents and disclosure of which is hereby incorporated herein by this reference.

U.S. Pat. Nos. 5,648,642 and 6,452,514 describe, generally, drive electrodes extending in rows on one side of a substrate and sense electrodes extending in columns on the other side of the substrate so as to define a "matrix" array of N by M nodes. Each node corresponds to an intersection between the electrically conductive lines of a drive electrode and of a sense electrode. A drive electrode simultaneously drives all of the nodes in a given row and a sense electrode senses all of the nodes in a given column. The capacitive coupling of the drive electrode and sense electrode (mutual capacitance), or the coupling of a sense electrode and ground (self-capacitance), at a node position may be separately or both measured to a change indicative of a touch event. For example, if a drive signal is applied to the drive electrode of row 2 and a sense electrode of column 3 is active then the node position is: (row 2, column 3). Nodes may be scanned by sequencing through different combinations of drive and sense electrodes. In one mode, the drive electrodes may be driven sequentially while the sense electrodes are all continuously monitored. In another mode, each sense electrode may be sampled sequentially.

Microcontrollers and digital logic, may, for example, be implemented to control the drive electrodes and analyze and measure the capacitive effects on the electrode circuit of the contact sensor. Integrated Circuit (IC) packages that include the microcontrollers may provide the input and output pins to communicate with a host; as well as the firmware to perform techniques and operations described herein. In the various examples described herein, microcontrollers may include, for example, peripheral microcontrollers, ARM-based microcontrollers, and AVR-8 and 32-bit microcontrollers.

By way of example, the sense electrodes of a touch sensor may be operatively coupled to a touch sensing circuit (for example, a charge integrator) by way of device I/O pins of a touch controller. A digital controller of the touch controller may be coupled to the touch sensing circuit by way of ADC/DAC pins. The digital controller's state machine may be configured to identify a touch and information about a touch.

Figure 1A:
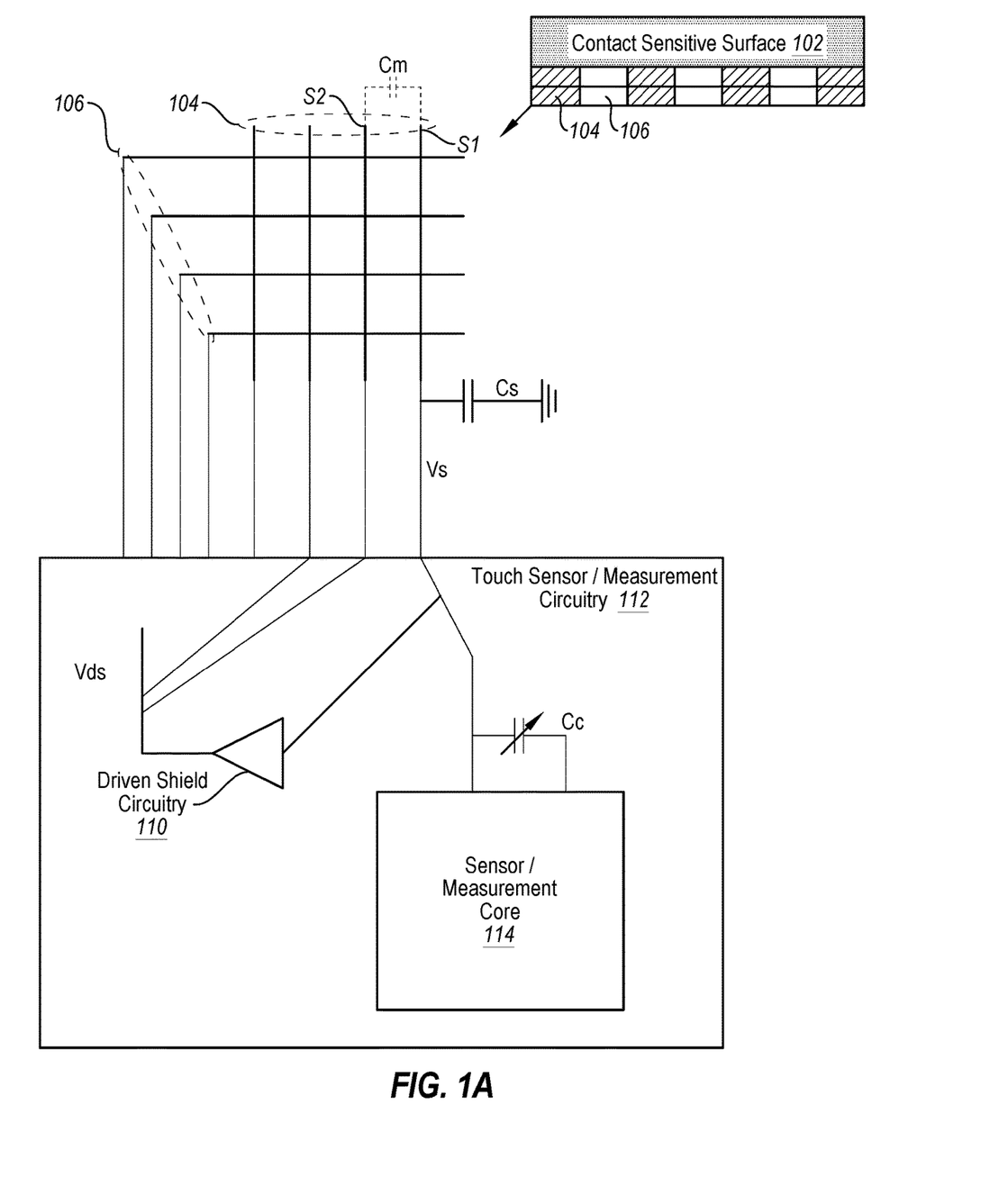
FIG. 1A shows a diagram for a conventional driven shield and a corresponding circuit.
Figure 1B:
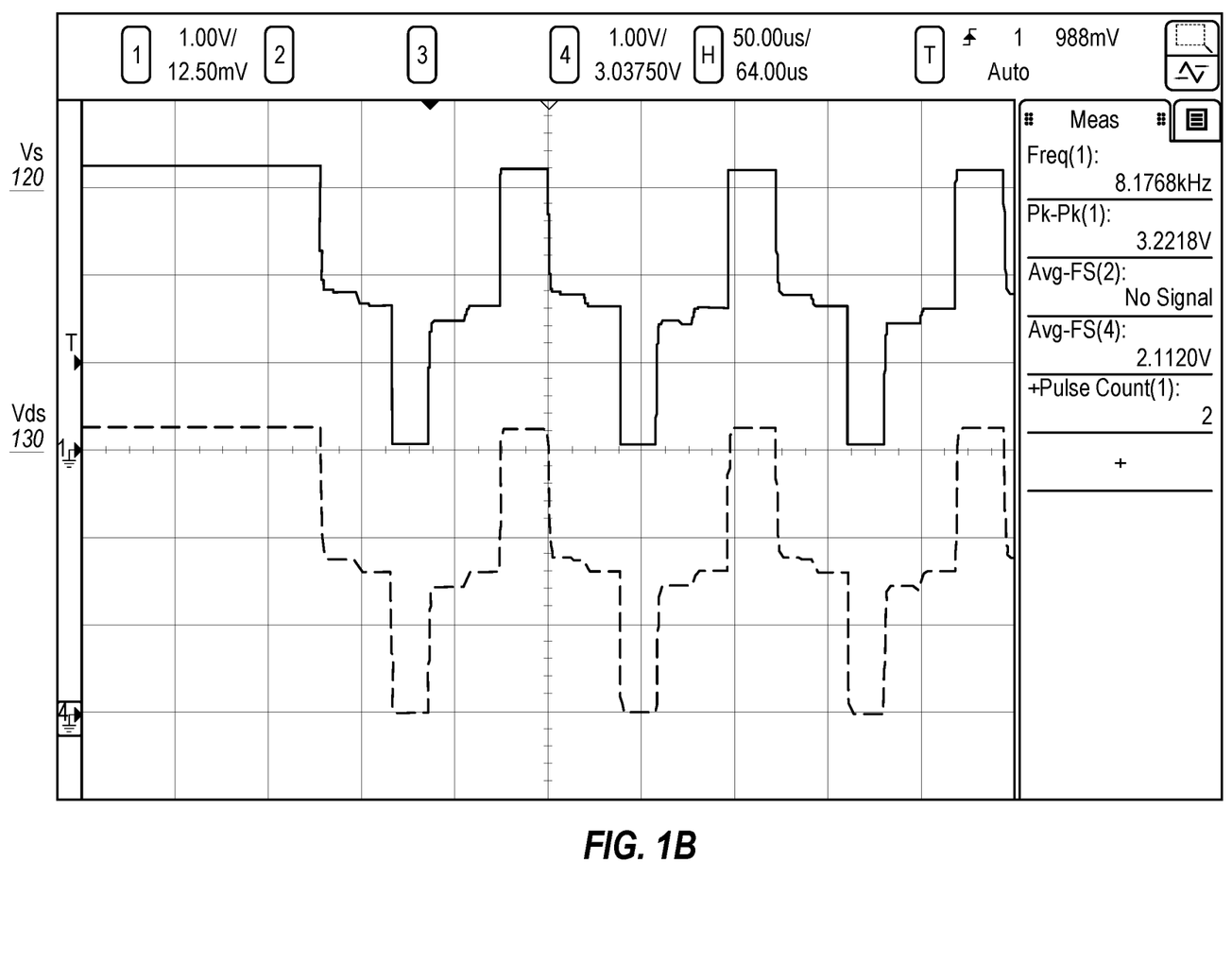
FIG. 1B shows a driven shield characterized by continuously tracked voltages of conventional driven shields, such as the driven shield of FIG. 1A.

FIGS. 1A and 1B show a capacitive touch system implementing an example of a conventional driven shield known to the inventor of this disclosure. FIG. 1A illustrates a contact sensitive surface 102 having a contact sensor of sense channels 104 and drive channels 106. The sense channels 104 are coupled to an interface 108 that may be coupled to a driven shield circuitry 110 and a measurement circuitry 112. Similarly, the drive channels 106 are coupled to the interface 108, which may couple the drive channels 106 to the driven shield circuitry 110 and the measurement circuitry 112. During a self-capacitance measurement scan, a controller 116 in the core 114 operatively couples (e.g., by a multiplexer "MUX") a pin or set of pins to the measurement circuitry 112 for the self-capacitance measurement, and operatively couples the pins for the remaining channels of sense channels 104 and drive channels 106 to the driven shield circuitry 110. If performing a total measurement, the controller 116 will operatively couple the next measured channel to the measurement circuitry while operatively coupling the last measured sensor channel to the driven shield circuitry 110. The driven shield circuitry 110 tracks the voltage on the measured sense channel and supplies a substantially equivalent voltage Vds (i.e., the driven shield) to the other sense channels (i.e., continuously supplies the tracked voltage).

As used herein, the term "driven shield" means the signal (e.g., voltage) that is supplied to the sense electrodes and drive electrodes of a contact sensor.

Notably, in conventional driven shield implementations known to the inventor of this disclosure the same delta voltage at the sense node is applied to the driven shield in the time between the end of a pre-charge phase and the measurement phase. Conventional driven shield circuitry such as driven shield circuitry 110 illustrated in FIG. 1A require drive capabilities for analog voltages other than the power rails.

As illustrated in FIG. 1B, the sense electrode S1 is being measured (i.e., the change in capacitance at the sense electrode S1) at the measurement circuitry 112. Sense electrode S2 is inactive, but there is a mutual capacitance $C_M$ between sense electrodes S1 and S2. Though not illustrated, a mutual capacitance may exist between the sense electrode S1 and the other drive electrodes and sense electrodes of the electrode circuitry. The voltage $V_S$ of the sense electrode S1 at the input to the sensing and measurement circuitry 112 is also received at a buffer-tracked driven shield circuitry 110. The driven shield circuitry 110 drives the voltage at the other electrodes to Vds, which is substantially equal to $V_S$, during the measurement cycle. This driven shield Vds effectively cancels out the effect of $C_M$ at the sensing and measurement circuitry 112.

FIG. 1B illustrates a driven shield sequence known to the inventor of this disclosure for the conventional driven shield Vds of FIG. 1A. The waveform 120 of Vs has pre-charge levels of 0/gnd and Vdd. The waveform 130 of Vds tracks the waveform 120 of Vs, having substantially the same peak-to-peak voltage.

In another conventional driven shield technique known to the inventor of this disclosure, the driven shield is not driven to track continuously Vs, but after a pre-charge it still has to settle to the same voltage delta as the sense node before the measurement. Thus, it still requires an analog buffer with the ability to drive an analog voltage different from gnd or Vdd. As with the conventional driven shield described with reference to FIGS. 1A and 1B, the voltage delta of the sensed node must substantially equal the driven shield in each measurement phase.

It is now understood by the inventor of this disclosure that mutual capacitance does not need to be canceled in each and every phase of the measurement acquisition cycle. More specifically, if a full measurement acquisition cycle is constructed to include at least two measurements, then the mutual capacitance may be measured in one phase and then the opposite of the mutual capacitance may be measured in the second phase. When the two measurements are subtracted (or summed depending on the arrangement), the mutual capacitance portions of the measurement values cancel each other out. In other words, a driven shield may be driven in one of the phases such that the accumulated effect from mutual capacitance equals zero in the final result.

By way of non-limiting example, where a full measurement acquisition cycle consists of two phases (the two phases may or may not be substantially symmetric), the two measurements are inverted around a symmetry point (e.g., Vdd/2). A charge measurement is taken from a positive sensor capacitor pre-charge, and then a charge measurement is taken from a negative sensor capacitance pre-charge.

These are referred to as the "P-measurement phase" and "N-measurement phase," respectively, in connection with the various examples of this disclosure. Since the two measurements have opposite signs, an overall result is achieved by subtracting the results from the P- and N-measurement phases.

While some examples are described in the analog domain, the described techniques, and this disclosure, are not so limited and may be performed in the digital domain, for example with logic gates, state machines, firmware executed by a microprocessor, and combinations thereof.

FIGS. 2, 3, 3B, 3C, and 4 illustrate an example of a driven shield sequence and related implementation that has at least several advantages known to the inventor of this disclosure as compared to the conventional driven shields and driven shield circuitry described, above. In various examples, a driven shield drives the non-measured sense and drive electrodes substantially to two voltages levels, Vdd and 0. Since just two voltage levels are used to drive the electrode circuitry, a driven shield circuit does not include a buffer to track the sensor voltage and drive the shield, unlike the conventional driven shield shown in FIG. 1A, which does include a buffer. Eliminating a buffer may be a significant cost savings in terms of power, area, and timing.

Figure 2:
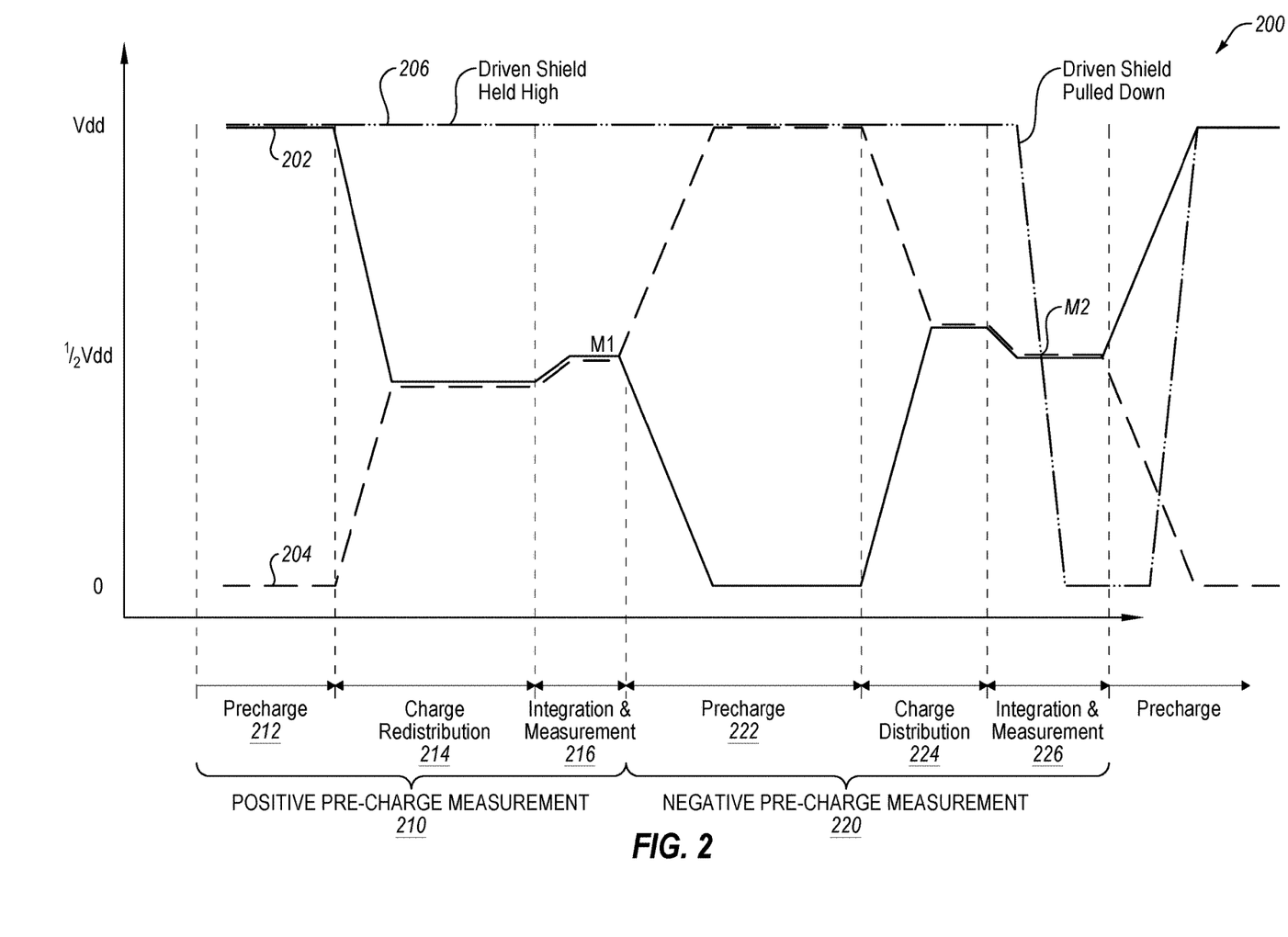
FIG. 2 shows a measurement acquisition cycle according to an example of the disclosure.

FIG. 2 illustrates a measurement acquisition cycle 200 according to an example of the disclosure. The total measurement acquisition cycle 200 has six phases, three phases for a measurement with positive pre-charge (the P-measurement phase 210), and three phases for a substantially symmetrically opposite measurement with a negative pre-charge (the N-measurement phase 220). The first phase is a pre-charge phase 212/222 of the sensor. The second phase is a charge balancing phase 214/224 (depicted in FIG. 2 as charge redistribution 214/224), where the resulting voltage 202 on $C_C$ and voltage 204 on $C_S$ should equal one-half the supply voltage, i.e., ½Vdd. A touch, or anything else changing $C_S$ will cause a misbalance from ½Vdd and that deviation may be measured. The third phase is an integration and measurement phase 216/226 where any deviation that is accumulated in an integrator is to be measured. The result is a representation of the difference in $C_S$ charge and $C_C$ charge, converted to a voltage across an integration capacitor (not shown).

Notably, as shown in FIG. 2, the driven shield 206 is driven with a rail-to-rail pulse between Vdd and 0. As used herein, "pulsing" refers to the change (i.e., the delta) in voltage applied—e.g., Vdd or −Vdd. The driven shield 206 is held high (Vdd) during all three phases of the P-measurement phase 210, including a measurement at M1. At a point in the measurement cycle just before M2, the full mutual capacitive affect has been accumulated in the measurement. The driven shield 206 is pulled down during the final phase of the N-measurement phase 220 just before a measurement is made at M2. The driven shield 206 is driven high again during the following pre-charge phase of the next measurement acquisition cycle. The total measured charge transfer after combining the P- and N-results represents only the self-capacitance. Notably, in one example, measurements M1 and M2 are made during a rising or falling edge, for example, of a pre-charge phase.

The net effects are described, below.

Ignoring the constant charge terms coming from the Cc capacitor balancing and also ignoring the final charge to voltage conversion, an equation for the total charge may be written as shown in Equations 1-3 below, where the "Q" represents charge. is the equations are equivalent to an actual implementation in terms of describing how the mutual capacitance effect is first accumulated, then canceled (note that if a sense electrode is driven actively to Vdd/2, the effect of a voltage delta on a driven shield may have an opposite sign in the measurement from the voltage delta on the sense node):

$$Q_P = \tfrac{1}{2} * Vdd * (Cs + Cm) \quad \text{(Eq. 1)}$$

$$Q_N = -\tfrac{1}{2} * Vdd * (Cs + Cm) + Vdd * Cm \quad \text{(Eq. 2)}$$

$$Q_{tot} = Q_P - Q_N = \tfrac{1}{2} * Vdd * (Cs + Cm) - (-\tfrac{1}{2} * Vdd * (Cs + Cm) + Vdd * Cm) = Vdd * Cs \quad \text{(Eq. 3)}$$

Notably, the intermediate accumulation of the mutual capacitance effect allows for the subsequent cancelation/subtraction. Turning back to FIG. 2, just before the M2, the accumulated mutual pulsing has reached Vdd, so the −Vdd change is applied (a pull from Vdd to 0) on the driven shield 206 before measurement M2 is made in order to cancel out the mutual capacitance effects. One of ordinary skill in the art will appreciate many variations in the technique described herein that may be achieved as long as the number of phases to accumulate Vdd is known and a cancelation measurement is also made. As long as the accumulated voltage deltas equal Vdd after some number of measurements, the next measurement need only cancel out the mutual capacitance effect after the end of this number of measurements.

Accordingly, in some examples, the voltage change at $C_S$ may settle at Vdd/3, Vdd/4, etc., and as long as the measurement acquisition cycle accumulates the full mutual capacitive effect then it may be canceled. So, for Vdd/3 there would be at least three measurement cycles to accumulate the full Vdd, and for Vdd/4 there would be at least four measurement cycles to accumulate the full Vdd, etc.

One of ordinary skill in the art would understand that the sign (positive or negative) is merely a design choice that affects the voltage directions and sign for a driven shield pulse. For example, the driven shield may start low, be pulled up during the first P-integration just after M1, held high all the way until the end of the N-phase through M2, and then pulled down again in the pre-charge for the next measurement acquisition cycle.

Figure 3:
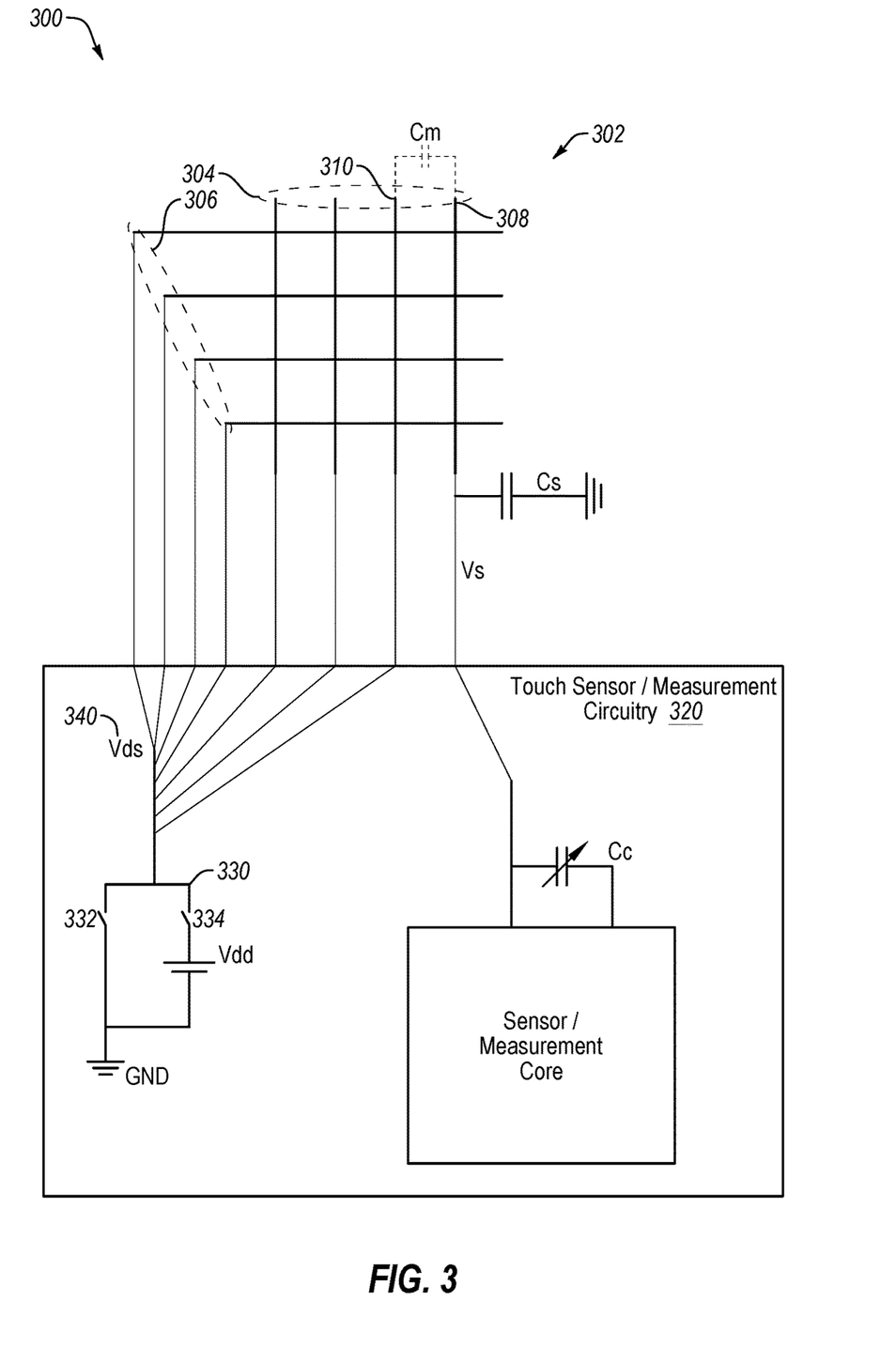
FIG. 3 shows a diagram for a driven shield implementation and a corresponding circuit according to an example of the disclosure.
Figure 4A:
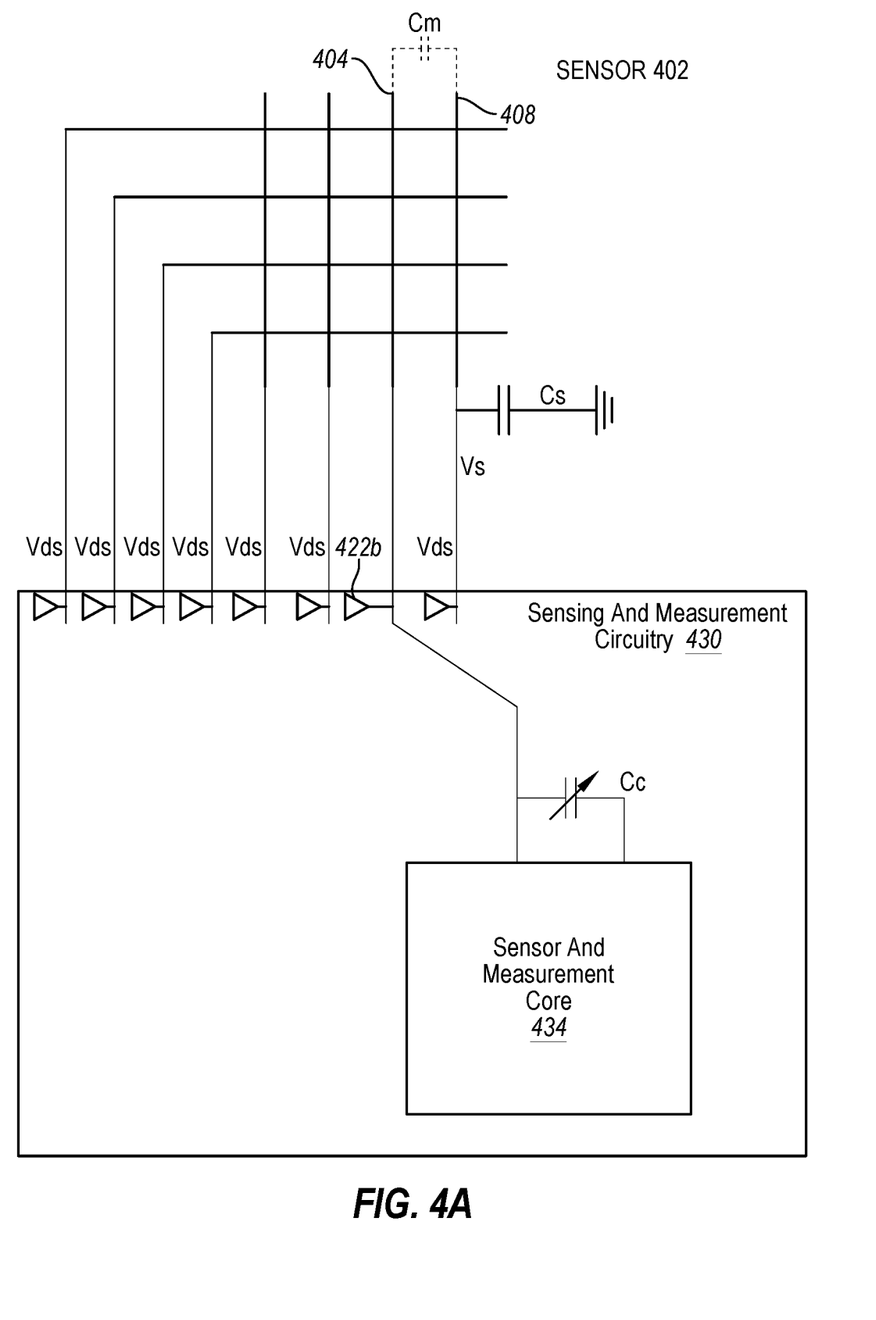
FIGS. 4A and 4B show a diagram for a driven shield implementation and a corresponding circuit, according to an example of the disclosure.
Figure 4B:
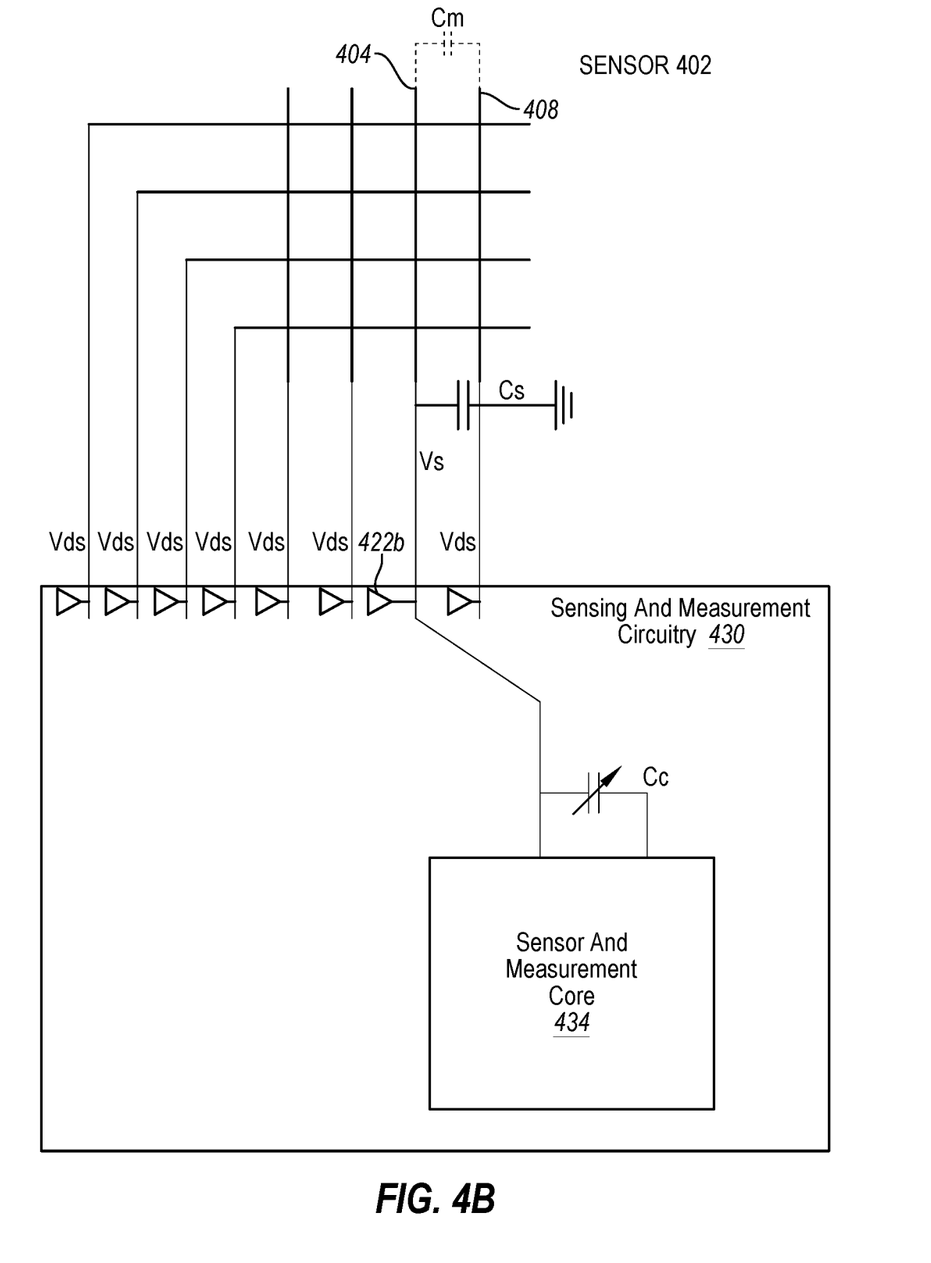
Figure 5:
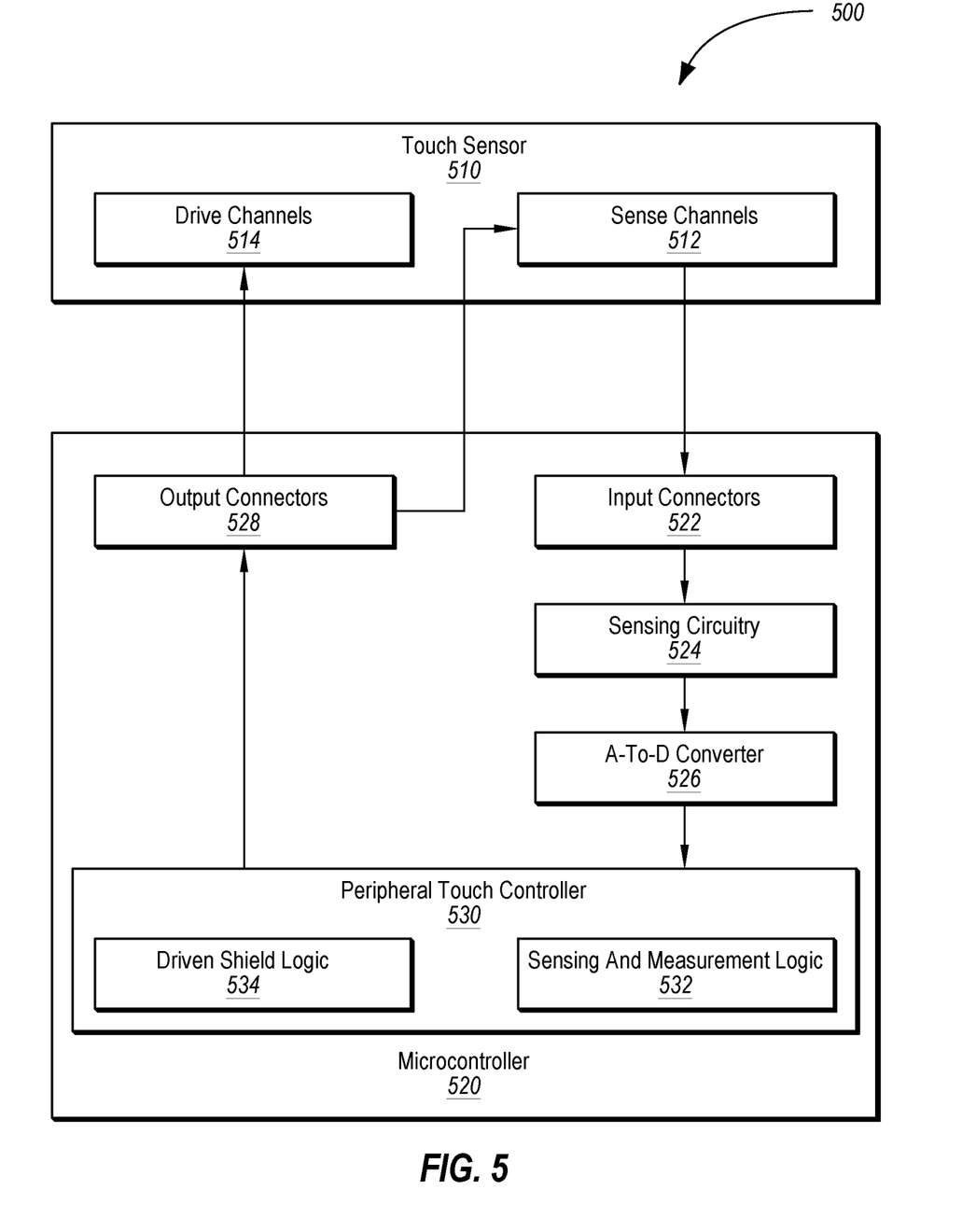
FIG. 5 shows a peripheral touch controller that is configured to implement a rail-to-rail driven shield, according to an example of the disclosure.

FIGS. 3, 4, and 5 illustrate a capacitive touch system implementing a driven shield, according to an example of the disclosure.

FIG. 3 illustrates capacitive touch circuit 300 configured to implement a driven shield according to an example of the disclosure. Capacitive touch circuit 300 includes electrode circuitry 302 (i.e., a touch sensor) that is operatively coupled to touch sensing and measurement circuitry 320. In the electrode circuitry 302, the sense electrode 308 is operatively coupled to the touch sensing and measurement circuitry 320, and may be measured. Sense electrode 310 is inactive, but there is a mutual capacitance Cm between sense electrode 308 and 310. Though not illustrated, a mutual capacitance may exist between the sense electrode 308 and the other drive and sense electrodes 306 and 304, respectively, of the electrode circuitry 302 (and among all the other in-active electrodes). A driven shield 340 (Vds 340) is implemented as a voltage driver of either GND or Vdd, and a driven shield circuitry 330 has two switches configured to control the rail-to-rail voltage applied to the inactive sense electrodes and inactive drive electrodes. When switch 332 is closed and switch 334 is open, the driven shield Vds 340 is pulled to ground. When switch 332 is open and switch 334 is closed, the driven shield Vds 340 is held at Vdd. In one example, the switches 332 and 334 may be transistors or diodes. One of ordinary skill in the art would understand that there are other ways to implement the driven shield circuitry 330 consistent with the examples of the disclosure.

FIGS. 4A and 4B illustrate a system where general purpose I/O (GPIO) drivers are used to drive pins in an IC to implement a driven shield according to examples of the disclosures, including a rail-to-rail driven shield. FIG. 4A shows a touch sensor 402 having sense channels 404 and drive channels 406, that may be part of a contact sensitive surface, for example, in a touch screen. The sense channels 404 are operatively coupled to the pins 422a to 422d of an IC having sensing and measurement circuitry 430. The drive channels 406 are operatively coupled to the pins 422e to 422h. The IC may include an interface (I/O) 424 that is configured to operatively couple the sensing and measurement circuitry 430 to the pins 422a to 422h, for example, by a MUX.

In one example, the touch sensing and measurement circuitry 430 is a microcontroller and the sensor and measurement core 434 is a touch controller is a processor executing firmware. The controller is loaded with firmware that enables it to perform the rail-to-rail driven shield logic according to examples of the disclosure.

In one example, one or more of the pins 422 are assigned (e.g., during integration with touch sensor 402 or a during setup operation) to the sense and drive electrodes of the touch sensor 402. By way of non-limiting example, a 4×4 matrix might use 8 of the pins 422 (shown as pins 422a to 422h in FIG. 4) on the device that are physically connected to 8 nodes on the touch sensor 402 (i.e., 4 lines in each direction for 4×4 matrix). The controller may be configured to operatively couple the pins 422 to the touch sensor 402 and the driven shield Vds. The controller may be configured to use the general-purpose I/O drivers of the IC for each pin to be driven to gnd or Vdd and implement the driven shield. In one example, the GPIO pins may be driven to a logical '1' or a '0' (e.g., Vdd or gnd).

FIG. 4B illustrates a subsequent measurement after performing self-capacitive sensing on sense channel 408, according to an example of the disclosure. Here, the controller operatively couples the pins 422b for sense channel 410 to the sensing and measurement circuitry 430, and sense channel 408 is operatively coupled to the driven shield.

In one example, a microcontroller is peripheral controller that is embedded on another microcontroller. The embedded peripheral controller may include the measurement logic, or, if it has its own state machine, may be operatively coupled to a digital control bus and programmed to control the output pins of the measurement unit, either through the general-purpose I/O drivers or with its own custom drivers.

FIG. 5 shows an example of a touch system 500 with a peripheral touch controller 530 that is embedded with a microcontroller 520, according to an example of the disclosure.

The sense channels 512 of touch sensor 510 are operatively coupled to the sensing circuitry 524 by way of the input connectors 522. The sense channels 512 and the drive channels 514 are operatively coupled to the touch controller 530 by the output connectors 528. In one example, the input connectors 522 and output connectors 528 may be general purpose input/output pins of the microcontroller 520 that the touch controller 530 is configured to control, for example, using the general purpose I/O drivers of the microcontroller 520, to connect the output connectors 528 to the rail-to-rail voltages (e.g., 0 and Vdd). In one example, the sensing circuitry 524 may be or include a charge integrator circuit. The ADC 526 is configured to provide digital signals responsive to the output of the sensing circuitry 524, that may be used by the sensing and measurement logic 532 of the touch controller 530 to measure and determine if a touch occurred. The peripheral touch controller 530 may include the sensing and measurement logic 532 and driven shield logic 534, which may be implemented, for example, as digital logic gates, a configurable state machine, or firmware executed by a microprocessor. The sensing and measurement logic 532 may also be configured to drive the drive channels 514 through the output connectors 528 to perform sense operations. The driven shield logic 534 may be configured to perform rail-to-rail driven shield logic described herein, and provide a driven shield Vds to the inactive channels of drive channels 514 and inactive channels of sense channels 512 during a sense operation of the sensing and measurement logic 532. The sensing and measurement logic 532, depending on the specific implementation of the driven shield logic 534, may be configured to perform a touch determination after unwanted mutual capacitive effects have been canceled (e.g., after a cancelation measurement) according to the examples of the disclosure.

Figure 6:
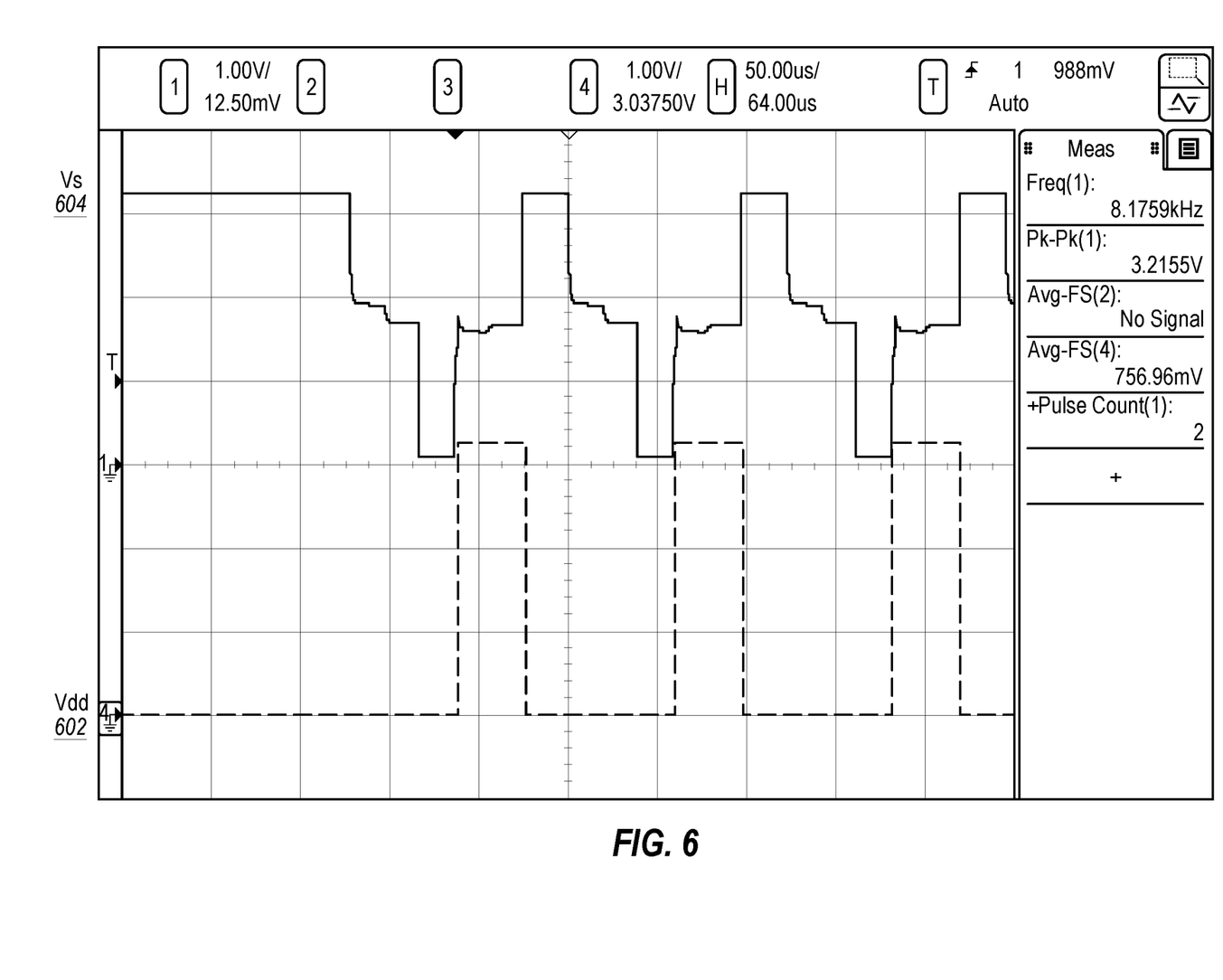
FIG. 6 shows a driven shield sequence during a measurement acquisition cycle, according to an example of the present disclosure.

FIG. 6 illustrates an example of a driven shield sequence, according to examples of the disclosure. The waveforms 602 and 604 of Vds and Vs, respectively, both oscillate between 0 and Vdd. Notably, the waveform 602 of Vds is a rail-to-rail waveform that does not equal the voltage deltas of Vs in each measurement cycle.

Figure 7:
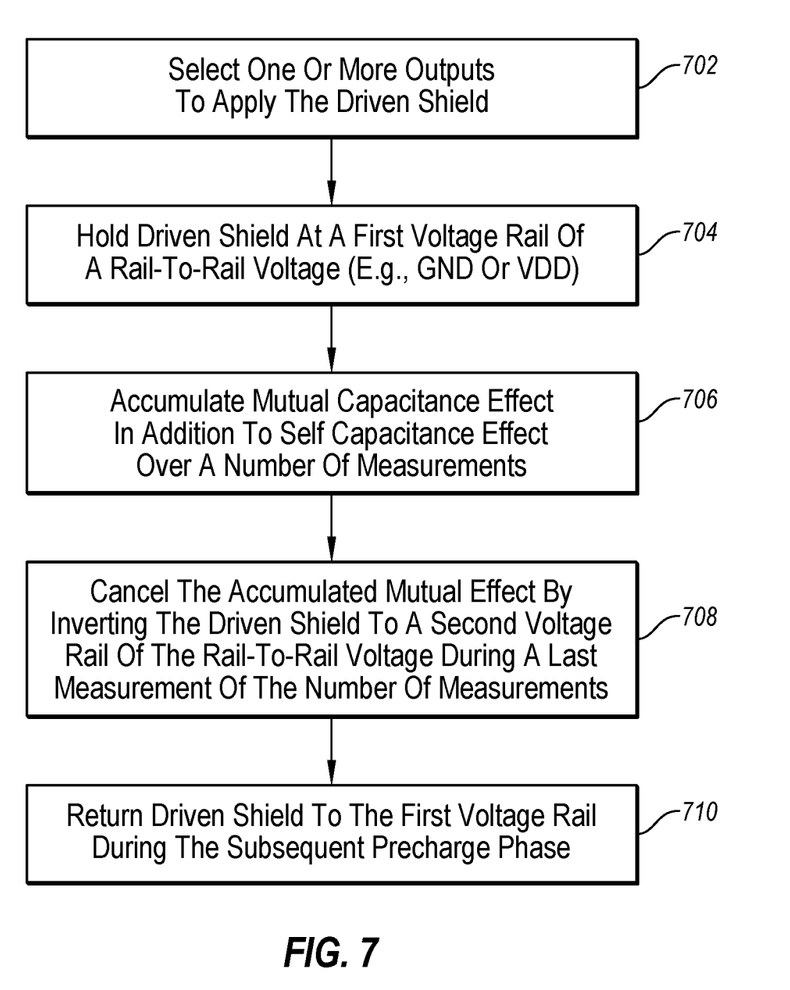
FIG. 7 shows a flowchart of a rail-to-rail pulsed driven-shield sequence implemented, at least in part, at an input/output of a microcontroller in order to cancel mutual capacitance effects, according to an example of the disclosure.

FIG. 7 illustrates a flow chart of a rail-to-rail pulsed driven-shield sequence implemented, at least in part, at an input/output of a microcontroller in order to cancel mutual capacitance effects, according to an example of the disclosure. In operation 702, one or more outputs are selected at which to apply a driven shield. In one example, the outputs may be programmable input/output pins controlled by using their general drivers. In operation 704, a driven shield is held at a first, predetermined, voltage rail at the selected one or more outputs. In one example, the first voltage rail and a second voltage rail correspond to a rail-to-rail voltage (e.g., Vdd or 0). In operation 706, self-capacitance and mutual capacitance effect are accumulated over a number of measurements. In one example, the number of measurements is predetermined. In another example, the number of measurements is based on the range between a first voltage rail and a second voltage rail of a rail-to-voltage rail. In operation 708, the driven shield is driven to the second (i.e., opposite) voltage rail (i.e., Vdd to 0 or 0 to Vdd) just before the final measurement (i.e., the cancelation measurement) of the number of measurements cancels the mutual capacitance effects. In operation 710, the driven shield is then driven back to the first voltage rail. In one example, the sequence and timing of the driven shield output is implemented in the firmware of the microcontroller.

Figure 8A:
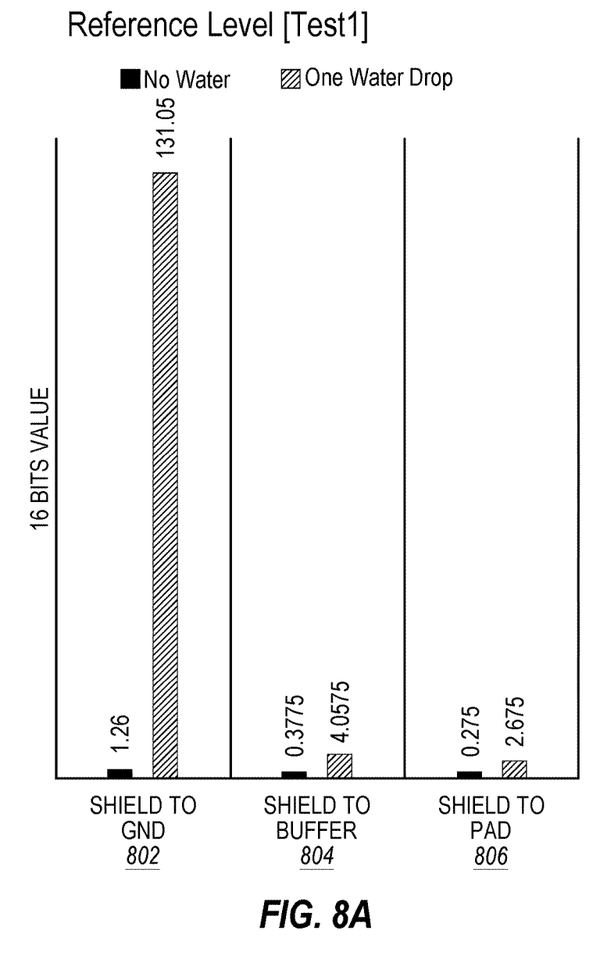
FIGS. 8A and 8B illustrate results of a mutual capacitance rejection system implementing a driven shield according to an example of the disclosure.
Figure 8B:
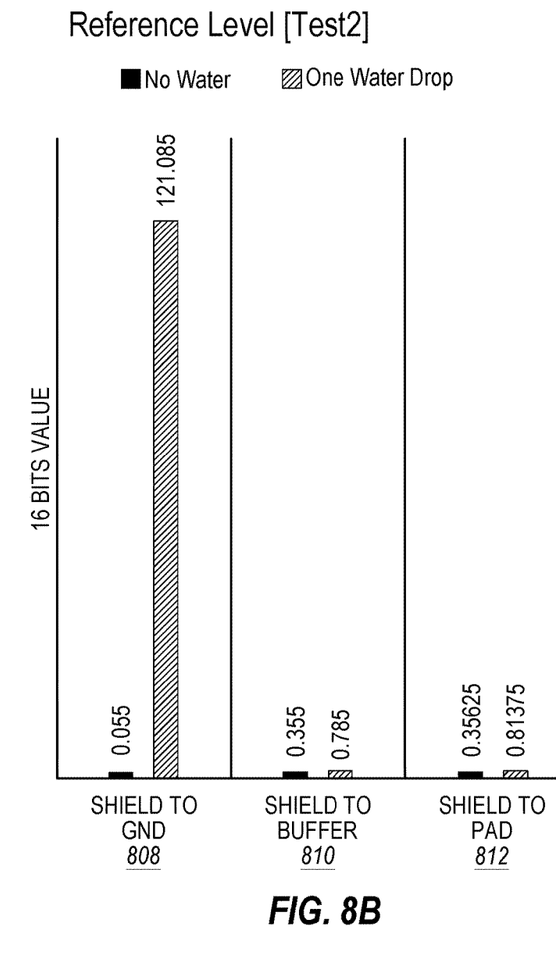

FIGS. 8A and 8B illustrate the results known to the inventor of this disclosure of a mutual capacitance rejection system implementing a driven shield according to an example of the disclosure. FIGS. 8A and 8B show the measurement values for test 1 and test 2, respectively, with the driven shield to ground (802/808), the driven shield to a buffer (804/810), and the driven shield to a pad (806/812). The driven shield to buffer is the conventional driven shield. The driven shield to a pad is an implementation of a driven shield according to examples of the disclosure. The y-axis is a deviation from a reference measurement taken before unwanted mutual capacitance is introduced to the system. The reference measurement is the green bar. In this example, water droplets are introduced to the contact sensitive surface after taking the reference measurement. The yellow bar is the measurement after the water is introduced. For the shield that is held to ground, the system sees the water drop as a signal because the system cannot distinguish between a water drop and a finger touch. For the shield that is held to buffer and shield to pad, the system does not see the water drop as a signal, and only registers a small amount of noise in the system.

A capacitive touch sensing system that implements the various examples of the driven shield described herein does not need to include an analog buffer to track the sensor voltage and drive the shield. Analog buffers typically require an increase in the area and power consumption budget of a device. Eliminating the analog buffer saves space, power, and complexity.

Many of the functional descriptions in this disclosure may be illustrated, described or labeled as modules, threads, steps, or other segregations of programming code, including firmware, in order to more particularly emphasize their implementation independence. Modules may be at least partially implemented in hardware, in one form or another. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented using software or firmware, stored on a physical storage device (e.g., a computer-readable storage medium), in memory, or a combination thereof for execution by various types of processors.

An identified module of executable code may, for instance, comprise one or more physical or logical blocks of computer instructions, which may, for instance, be organized as a thread, object, procedure, or function. Nevertheless, the executable of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several storage or memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more physical devices, which are referred to herein as computer-readable media.

In some examples, the software portions are stored in a non-transitory state such that the software portions, or representations thereof, persist in the same physical location for a period of time. Additionally, in some examples, the software portions are stored on one or more non-transitory storage devices, which include hardware elements capable of storing non-transitory states and/or signals representative of the software portions, even though other portions of the non-transitory storage devices may be capable of altering and/or transmitting the signals. Examples of non-transitory storage devices are Flash memory and random-access-memory (RAM). Another example of a non-transitory storage device includes a read-only memory (ROM), which can store signals and/or states representative of the software portions for a period of time. However, the ability to store the signals and/or states is not diminished by further functionality of transmitting signals that are the same as or representative of the stored signals and/or states. For example, a processor may access the ROM to obtain signals that are representative of the stored signals and/or states in order to execute the corresponding software instructions.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

Additional non-limiting examples of the disclosure, include:

Example 1. A capacitive touch circuitry, the circuitry comprising: an interface circuitry; and a driven shield circuitry operatively coupled to the interface circuitry and configured to vary a shield voltage from a first voltage rail during a number of measurement cycles to a second voltage rail after the number of measurement cycles.

Example 2. The circuitry according to Example 1, wherein the driven shield is configured vary the shield voltage from the second voltage rail to the first voltage rail at the beginning of a second number of measurement cycles.

Example 3. The circuitry according to any one of Examples 1 to 2, wherein the driven shield circuitry is configured to vary the shield voltage in accordance with a rising or falling edge of a pre-charge cycle.

Example 4. The circuitry according to any one of Examples 1 to 3, further comprising sensing circuitry configured to provide a voltage responsive to changes in capacitance of a sense electrode.

Example 5. The circuitry according to any one of Examples 1 to 4, wherein the number of measurement cycles comprise a first measurement cycle, a last measurement cycle, and at least one intermediate measurement cycle between the first measurement cycle and the last measurement cycle.

Example 6. The circuitry according to any one of Examples 1 to 5, wherein a sensor voltage change from the first measurement cycle to the at least one intermediate measurement cycle is different than a shield voltage change from the first measurement cycle to the at least one intermediate measurement cycle.

Example 7. The circuitry according to any one of Examples 1 to 6, wherein a total sensor voltage change from the first measurement cycle to the last measurement cycle is equal to the shield voltage change from the first measurement cycle to the last measurement cycle, wherein the total sensor voltage change is the sum of a first sensor voltage change from the first measurement cycle to the at least one intermediate measurement cycle and a second sensor voltage change from the at least one intermediate measurement cycle and the last measurement cycle.

Example 8. A method of providing a driven shield, the method comprising: taking a number of measurements at a sensed line over a number of measurement cycles, the measurement responsive to a voltage change at that sensed line; and varying a voltage applied to at least one non-sensed line over the number of measurement cycles, wherein a voltage change at the at least one non-sensed line is different than the voltage change at the sensed line.

Example 9. The method according to Example 8, wherein the voltage change at the at least one non-sensed line and the voltage change at the sensed line is different during a measurement phase.

Example 10. The method according to any one of Examples 8 to 9, wherein the varying the voltage comprises asserting a second voltage rail subsequent to an asserted first voltage rail.

Example 11. The method according to any one of Examples 8 to 10, wherein at least one of the first voltage rail and the second voltage rail is equal to ground, and at least one of the first voltage rail and the second voltage rail is equal to a supply voltage.

Example 12. The method according to any one of Examples 8 to 11, wherein the number of measurement cycles comprise a first measurement cycle, a last measurement cycle, and at least one intermediate measurement cycle between the first measurement cycle and the last measurement cycle.

Example 13. The method according to any one of Example 8 to 12, wherein a total voltage change at the sensed line from the first measurement cycle to the last measurement cycle is equal to voltage change at the at least one non-sensed line from the first measurement cycle to the last measurement cycle, wherein the total voltage change at the sensed line is the sum of a first voltage change at the sensed line from the first measurement cycle to the at least one intermediate measurement cycle and a second voltage change at the sensed line from the at least one intermediate measurement cycle and the last measurement cycle.

Example 14. A capacitive touch circuitry, the circuitry comprising: electrode circuitry; driven shield circuitry that is configured to drive one or more inactive electrodes of the electrode circuitry between two reference voltage rails thereby inducing mutual capacitive effects at an active sense electrode; and self-capacitance sensing circuitry that is operatively coupled to the active sense electrode and configured to provide one or more measurable signals that are indicative of the induced mutual capacitive effects.

Example 15. The circuitry according to Example 14, further comprising measurement circuitry operatively coupled to the electrode circuitry and configured to drive an active drive electrode thereby inducing self-capacitance effects at the active sense electrode.

Example 16. The circuitry according to any of Example 14 to 15, wherein the measurement circuitry is configured to drive the active drive electrode while the driven shield circuitry drives the one or more inactive electrodes.

Example 17. The circuitry according to any of Examples 14 to 16, wherein driven shield circuitry is configured to output a rail-to-rail pulse, and wherein the measurement circuitry is configured to: generate measurement values that comprise, in part, mutual capacitive effects of the rail-to-rail pulse; and combine the measurement values to generate a final measurement value that does not include the mutual capacitive effects.

Example 18. A method of performing capacitive sensing, the method comprising: driving a first voltage rail at first inactive sense lines and first inactive drive lines during a predetermined number of measurement phases of a first measurement cycle; measuring an active sense line during the first measurement cycle; driving a first voltage change to a second voltage rail at the first inactive sense lines and the first inactive drive lines before a subsequent measurement cycle; and measuring the active sense line while the second voltage rail is driven and during a last measurement phase of the first measurement cycle.

Example 19. A microcontroller package comprising the capacitive touch circuitry of any one of Examples 1 to 7.

Example 20. An embedded microcontroller package comprising the capacitive touch circuitry of any one of Examples 1 to 7.

Example 21. A microcontroller package, comprising: a number of programmable input/output (I/O) pins; sensing circuitry configured to provide one or more measurable signals that are indicative of voltage changes at one or more of the number of programmable I/O pins; and a touch controller configured to provide a driven shield voltage during a number of measurement cycles, by: holding one or more programmable I/O pins associated with inactive drive electrodes and inactive sense electrodes to a first voltage rail during a first measurement cycle; and driving the one or more programmable I/O pins associated with inactive drive electrodes and inactive sense electrodes to a second voltage rail during a last measurement cycle.

Example 22. The microcontroller package according to Example 21, wherein the touch controller is an embedded microcontroller.

Example 23. The microcontroller package according to any of Examples 21 to 22, wherein the first voltage rail is equal to ground and the second voltage rail is equal to a supply voltage.

Example 24. The microcontroller package according to any of Examples 21 to 23, further comprising a digital control bus, and wherein the touch controller is operatively coupled to the digital control bus.

Example 25. The microcontroller package according to any of Examples 21 to 24, further comprising general purpose input/output drivers that are operably coupled to the digital control bus.

Example 26. The microcontroller package according to any of Examples 21 to 25, wherein the general purpose I/O drivers are configurable responsive to one or more digital control signals provided by the touch controller to the digital control bus.

Example 27. The microcontroller package according to any of Examples 21 to 26, wherein the touch controller comprises one or more custom input/output (I/O) drivers that are configured to control one or more of the number of programmable input/output (I/O) pins.

The invention claimed is:

1. A method of providing a driven shield, the method comprising:
    taking a capacitance measurement at a sensed line during a measurement phase of a measurement acquisition cycle, the measurement phase including a positive pre-charge measurement phase and a negative pre-charge measurement phase;
    applying a voltage to at least one non-sensed line during the measurement phase of the measurement acquisition cycle;
    holding the voltage at a first voltage rail during one of the positive pre-charge measurement phase and the negative pre-charge measurement phase; and
    varying the voltage, in a generally increasing or decreasing manner, from the first voltage rail to a second voltage rail during the other one of the positive pre-charge measurement phase and the negative pre-charge measurement phase.

2. The method of claim 1, wherein varying the voltage, in a generally increasing or decreasing manner, from the first voltage rail to the second voltage rail during the other one of the positive pre-charge measurement phase and the negative pre-charge measurement phase comprises:
   varying the voltage, in a generally increasing or decreasing manner, from the first voltage rail to the second voltage rail during an integration and measurement phase of the other one of the positive pre-charge measurement phase and the negative pre-charge measurement phase.

3. The method of claim 2, comprising:
   starting varying the voltage from the first voltage rail after a start of the integration and measurement phase; and
   ending varying the voltage to the second voltage rail before an end of the integration and measurement phase.

4. The method of claim 1, wherein the varying the voltage comprises asserting a second voltage rail subsequent to an asserted first voltage rail.

5. The method of claim 2, wherein at least one of the first voltage rail and the second voltage rail is equal to ground, and at least one of the first voltage rail and the second voltage rail is equal to a supply voltage.

6. The method of claim 1, wherein a total voltage change at the sensed line during the measurement acquisition cycle is substantially the same as a total voltage change at the at least one non-sensed line during the measurement acquisition cycle.

7. The method of claim 1, wherein the taking a capacitance measurement at the sensed line during the measurement phase of the measurement acquisition cycle comprises:
   taking a self-capacitance measurement at the sensed line during the measurement phase of the measurement acquisition cycle comprises.

8. An apparatus, comprising:
   a measurement circuit to take self-capacitance measurements of a sensed line during at least two measurement phases of a measurement acquisition cycle, the at least two measurement phases including a positive pre-charge measurement phase and a negative pre-charge measurement phase; and
   a driven shield circuit to generate a shield voltage at a non-sensed line during the at least two measurement phases of the measurement acquisition cycle, wherein to generate the shield voltage, the driven shield circuit to:
   hold the shield voltage at a first voltage rail during one of the positive pre-charge measurement phase or the negative pre-charge measurement phase; and
   change the shield voltage, in an increasing or a decreasing manner, from the first voltage rail to a second voltage rail during the other one of the positive pre-charge measurement phase or the negative pre-charge measurement phase.

9. The apparatus of claim 8, wherein the driven shield circuit to vary the shield voltage in accordance with one of a rising edge of a pre-charge cycle or a falling edge of the pre-charge cycle.

10. The apparatus of claim 8, wherein one or more of the positive pre-charge measurement phase or the negative pre-charge measurement phase includes a pre-charge phase, a charge redistribution phase, and an integration and measurement phase.

11. The apparatus of claim 8, wherein the driven shield circuit to change the shield voltage having a polarity that is different than a polarity of a sensor voltage change during the other one of the positive pre-charge measurement phase or the negative pre-charge measurement phase.

12. The apparatus of claim 8, wherein the measurement circuit to cause a sensor voltage to change from the first voltage rail to the second voltage rail, or vice-versa, during the measurement acquisition cycle.

13. A system, comprising:
   a touch sensor;
   a measurement circuit to take self-capacitance measurements of a sensed line of the touch sensor during at least two measurement phases of a measurement acquisition cycle, the at least two measurement phases including a positive pre-charge measurement phase and a negative pre-charge measurement phase; and
   a driven shield circuit to generate a shield voltage at a non-sensed line of the touch sensor during the at least two measurement phases of the measurement acquisition cycle, wherein to generate the shield voltage, the driven shield circuit to:
   hold the shield voltage at a first voltage rail during one of the positive pre-charge measurement phase or the negative pre-charge measurement phase; and
   change the shield voltage, in an increasing or a decreasing manner, from the first voltage rail to a second voltage rail during the other one of the positive pre-charge measurement phase or the negative pre-charge measurement phase.

* * * * *

UNITED STATES PATENT AND TRADEMARK OFFICE
CERTIFICATE OF CORRECTION

PATENT NO. : 11,893,175 B2
APPLICATION NO. : 17/931810
DATED : February 6, 2024
INVENTOR(S) : Anders Vinje It is certified that error appears in the above-identified patent and that said Letters Patent is hereby corrected as shown below:

In the Specification
Column 1, Line 9, change "11,442,586 issued" to --11,442,586, issued--

Signed and Sealed this
Ninth Day of April, 2024

Katherine Kelly Vidal
*Director of the United States Patent and Trademark Office*